United States Patent
Chamberlain et al.

[11] Patent Number: 5,614,278
[45] Date of Patent: Mar. 25, 1997

[54] STRIP OF SEPARABLE LABELS OR TAGS HAVING A DISPLAY SURFACE FOR DISPLAY OF INFORMATION THEREON

[75] Inventors: John Chamberlain, Boca Raton, Fla.; Gordon Klassen, Dossenheim, Germany

[73] Assignee: Esselte Meto International GmbH, Heppenheim, Germany

[21] Appl. No.: 436,759

[22] Filed: May 8, 1995

[30] Foreign Application Priority Data

May 10, 1994 [DE] Germany ............ 44 16 444.0
Oct. 11, 1994 [DE] Germany ............ 44 36 284.6

[51] Int. Cl.$^6$ .................................................. C09J 7/02
[52] U.S. Cl. .................. 428/41.4; 428/41.7; 428/41.8; 428/42.1; 428/354
[58] Field of Search .................... 428/40, 42, 343, 428/354, 41.4, 41.7, 41.8, 42.1

[56] References Cited

U.S. PATENT DOCUMENTS 3,415,705  12/1968  Ettre .
4,475,969  10/1984  Reed .
4,694,283  9/1987   Reeb .
5,083,112  1/1992   Piotrowski et al. .

FOREIGN PATENT DOCUMENTS 2931932  2/1981   Germany .
3143208  5/1983   Germany .
3244430  11/1984  Germany .
3836480  5/1989   Germany .
4025746  2/1992   Germany .
4129446  3/1992   Germany .
4129693  3/1993   Germany .
4223394  1/1994   Germany .
4238145  5/1994   Germany .
4239846  6/1994   Germany .
4300411  7/1994   Germany .

Primary Examiner—Jenna Davis
Attorney, Agent, or Firm—Nils H. Ljungman and Associates

[57] ABSTRACT

Labels or tags, are generally supplied in the form of a strip of a large number of consecutive, separable units, wherein the components of the labels or tags are essentially fed in a continuous stream to the strip as the strip moves along a path of travel. Under some circumstances however it has been found that it can be cost effective that all of the labels do not include all of the individual components, or that it might not be desirable that the various components are not always disposed at the exact same position in each label.

20 Claims, 9 Drawing Sheets

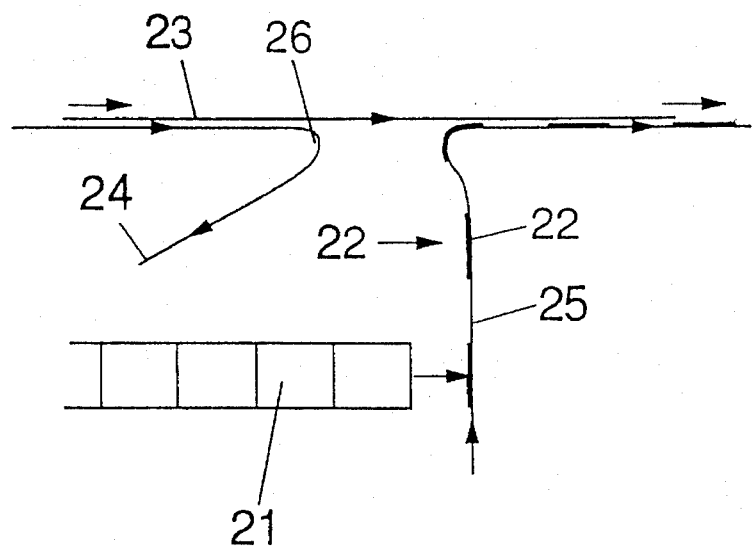
FIG. 8
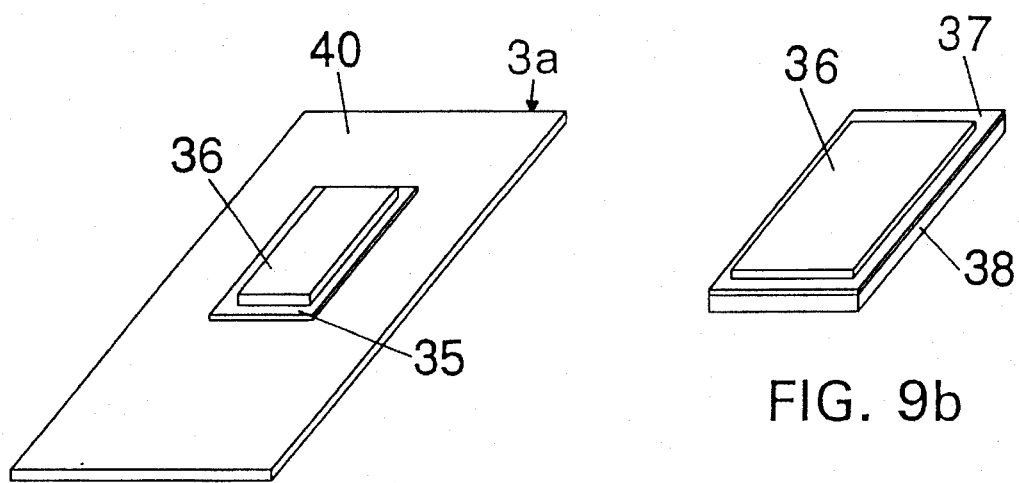
FIG. 9a
FIG. 9b
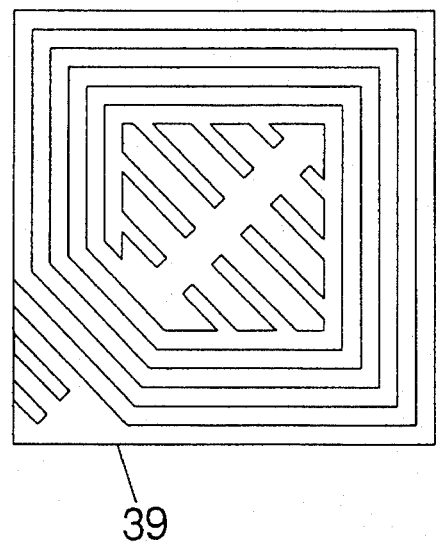
FIG. 9c

STRIP OF SEPARABLE LABELS OR TAGS HAVING A DISPLAY SURFACE FOR DISPLAY OF INFORMATION THEREON

BACKGROUND OF THE INVENTION

1. Field of the Invention

This invention generally relates to labels or tags, generally supplied, or at least manufactured in the form of a strip having a large number of consecutive, separable units. Such labels or tags commonly have at least one surface for the display of information thereon relating to the particular product, i.e., product name, manufacturer, use or care instructions, price, etc. Labels or tags of this type are generally used by retail stores for marking of the goods available for sale. The labels or tags are also generally configured with an arrangement for fastening the labels or tags to an object, or can sometimes simply be sewed on, or possibly stapled or pinned, when the object has at least a fabric portion. Alternatively, an adhesive could be used for fastening the labels or tags to solid objects.

The provision of the labels or tags in the form of a strip of separable units provides for the easier handling and/or application of the labels or tags by the retailer. For the strip of labels, there would generally be a substrate, or backing sheet, having the adhesive labels detachably bonded thereto, and for the strip of tags, the tags can be made from a paper-like material, i.e., a thin cardboard, for example, and the tags can essentially be interconnected. For such tags, it is common to provide a continuous strip of the paper-like material with perforations defining the individual tags, wherein thee perforations allow for relatively easy separation of the individual tags from one another.

Another common label or tag of the type described above is a label or tag configured for the protection of the retail goods from theft. In this case, the labels would be provided with a detectable security element, which security element, unless deactivated or removed, can trigger an alarm device upon passage through a detector. Such labels or tags are typically manufactured by putting together a cover layer and a security element, whereby when the label or tag is applied to the product, the cover layer essentially hides the security element from easy viewing by a potential shoplifter. In the case where such a tag might have two visible sides, a second cover layer can also be used, with the security element disposed between the two cover layers.

2. Background Information

It is known for commercial establishments, such as retail stores, to protect articles of particular value against theft by affixing a security element mounted in labels or tags to the articles, end installing an appropriate detector in an exit area to interact with the security element. The security element interacts with the detector upon the movement of the security element within the threshold of the detection area. The security element interacts typically electromagnetically, that is, through high-frequency waves, or magnetically. Accordingly, when a security element, not previously deactivated by the sales personnel, is passed through the detector with shoplifting intent, the detector should respond, issuing an audible and/or visual and/or electronic warning signal.

Conventionally, such security labels are supplied on substrates to which they are fastened by means of adhesive bonding. The substrate and label material are preferably configured so that the adhesive stays with the label material rather than on the substrate upon removal of the label from the substrate. When labelling articles, the sales personnel essentially only need to detach the labels manually, or alternatively by means of a suitable hand-held labeller, from the substrate, and then secure the labels subsequently to the appropriate article by means of the layer of adhesive provided on the rear side of the label. Alternatively, the articles to be protected may be provided with security labels already at the manufacturer's site or in distributing centers.

To protect all labelled articles against theft, all of the labels supplied on a web or a roll of substrate are equipped with security elements, and the security elements are mounted invariably at the same location on each label. Because each label is provided with a security element the price of the security labels can be considerably higher than the price of conventional labels.

It is considered a disadvantage that the price of the security labels is rather elevated, being primarily due to the electromagnetic security elements integrated therein. In-depth studies have revealed that a maximum financial return can be obtained by protecting only a certain percentage of the articles exposed to the risk of theft. However, the potential cost savings are essentially nullified because of the need to use two different types of label, that is, protected labels, and non-protected labels, under which circumstances, the articles provided with non-protected labels can then easily be recognized and removed with preference. Moreover, labelling or tagging articles with two different types of labels or tags proves a time-consuming task.

It is a further disadvantage of conventional security labels that the electromagnetically active elements are invariably positioned at the same location on each label. Thus, a potential shoplifter would generally have little difficulty in recognizing the protected labels, removing the label, and carrying the then unprotected article through the surveillance gates unhindered.

A known and somewhat generic method of manufacturing such labels is disclosed in German Patent No. 4238145 A1. In this known manufacturing method, a backing strip is unwound from a roll and is coated with an adhesive, whereupon a continuous, magnetically soft metal strip, which strip acts as the security element, is applied to the backing strip. Then, a cover layer is applied to the adhesive backing, and the material is then punched or stamped into the form of labels or tags.

In the known manufacturing method, continuous metal strips are used as electromagnetically active or activatable security elements. These metal strips extend in the axial direction over the entire length of a strip of labels, and thus also over the entire height or width of a finished, punched label or tag. On large labels, therefore, the surface area of the security elements is excessively large, and a significantly smaller surface area would be sufficient to guarantee reliable detection. On account of the large surface areas, the price of the labels is proportionately increased, and the disadvantageous consequence is that the labels or tags are expensive to produce.

OBJECT OF THE INVENTION

It is an object of the present invention to provide security labels which, on the one hand, feature low manufacturing cost, and, on the other hand, are difficult to identify. Further, it is desirable to create a method which makes it possible to reduce the cost of manufacturing security labels or security tags.

SUMMARY OF THE INVENTION

It has been determined that the above objects can essentially be achieved at the point of manufacture of the labels or tags, wherein, in one possible embodiment, all of the labels of a label strip are not provided with a security element, or alternatively, the position of the security elements on the labels is varied to make recognition of the security labels more difficult. The possible solutions presented above can essentially be achieved in practice independently of each other, but can also be advantageously combined to provide an even greater degree of utility, wherein there would be a cost reduction due to absence of security elements in some of the labels, and also reduced recognizability of the security labels due to varied placement of the security elements therein.

According to the present invention, this object can be accomplished in that only a specified number of the labels or tags is provided with electromagnetically active or activatable security elements. Thus, rather then protecting 100% of the tags or labels of a web, only a fixed percentage (which could be for example, about 80%) of the tags or labels can preferably be provided with security elements, while the remaining labels are not electromagnetically active or not activatable. Considering that all labels or tags are made of the same material, are printed in the same way and originate from the same web, it will therefore essentially be difficult for an unknowing shoplifter to recognize which of the labels are electromagnetically protected and which of the labels are non-protected. For this purpose, it would essentially be preferable to configure the label such that the security element is disguised. In other words, a protected label having a security element should not be visually distinguishable from the other labels which do not have a security element.

In addition to label-carrying webs of substrate, the idea underlying the present invention also covers rolls of substrate suitable for use in dispensing or labelling equipment, as well as any kind of security tag of a paper-like material supplied in the form of rolls or webs or as a card (that is, two-dimensionally superposed and juxtaposed) and separated in the labelling process by means of perforations separating adjacent tags.

Aside from reducing the manufacturing cost significantly, the present invention also affords the advantage of rendering it very difficult to distinguish a security label or security tag from an ineffective dummy, keeping the probability of theft low. The financial expenditure incurred by the article surveillance system can thereby be reduced.

In view of the fact that not only shoplifters but also shop staff cause a significant proportion of retail shrinkage, shop security staff are often obliged to label goods only after the other shop staff have left. In this manner, the other staff do not see which article is provided with an active or inactive label or tag. While one implementation of the present invention, involving a regularly recurring pattern of protected and non-protected labels, might not be recognized by a potential shoplifter or only with difficulty, such a pattern could be recognized by staff who are in close daily contact with the goods and the labels, thus enabling the staff to select out non-protected articles and remove the non-protected articles from the sales room without authorization. Therefore, an advantageous embodiment of the present invention provides for an irregular distribution of protected labels or tags on the web, that is, in a random fashion, so that the pattern is recognizable neither by the customer nor by the shop staff.

Irregular distribution as used herein means an uncorrelated pattern with a low repeat probability on a web, as a result of which active and inactive labels are positioned on each web in a changing pattern. The ratio of protected to non-protected tags or labels can essentially remain, however, approximately constant. Such a pattern can be produced, for example, in a computer-controlled machine using a random number generator for randomly determining which labels will not receive a security element.

It can essentially be further advantageous to provide the electromagnetically inactive labels or tags with dummies conformed in shape, size and color to a security element, so as to make the unprotected labels visually indistinguishable from active labels and thus to prevent the unprotected labels from being detached from the protected article prior to a theft attempt. For example, the dummies may have a printing ink image representing an element of the security element. This ink image can essentially be applied to a blank paper having the same size and shape of the security element and applied in the same manner as the security elements, or can alternatively be applied to the side of paper labels disposed towards the substrate, or can be printed in the inside of tags. The option also exists to use foils or sheets of metal that are adhesively bonded to the rear side of the labels or are inserted within the tags.

As an alternative to the above-discussed embodiment, the problem underlying the present invention may alternatively, or in addition, be solved by varying the position of the security elements (or security element/blank distribution) on the labels or tags in a direction along and/or across the movement direction of the web as the labels or tags are manufactured.

As such, this alternative makes recognition of the security elements more difficult by providing the security elements at different locations on, or within, the labels. Because in conventional labels the security elements are invariably positioned at the same location, a potential shoplifter finding no security element at the known location may assume that the label is not protected, leaving it attached to the article. Any unauthorized attempt to remove the article from the shop will then be detected at the surveillance gate. In this alternative of the present invention, the position of the security element varies in the axial, or longitudinal direction of the web of labels (that is, the substrate) or the tags and/or in the direction orthogonal thereto (across the web width).

The advantages of this alternative reside primarily in rendering identification of the security elements more difficult, thus improving the safeguard against theft.

In order to avoid that the location of the security elements becomes obvious to staff or customers because it is repeated in a regular pattern, an irregular, that is, random, positioning of the security elements would be preferable. It can thus be possible to position the security elements using a random number generator. The unpredictable, always different (uncorrelated) position of the security elements on the labels or tags would then essentially make identification of security labels still more difficult, thus affording a further improved safeguard against theft.

It is further recommended to provide also the side of the security element close to the substrate with a self-adhesive coating in order make detachment of the security element and/or the label from the labelled article more difficult.

Alternatively, the security element, protected and identifiable as such only with difficulty, may also be provided inside the label or tag.

In respect of the type of security element which can be used in the context as set forth above, essentially any of the various known label-type devices could be used. Some of the available options are set forth below First, a narrow strip of a magnetically soft material may be utilized. At the surveillance gate, an alternating magnetic field is applied thereto, causing reversal of the magnetization in accordance with the respective frequency. Because the strip then emits an alternating field itself which is detected by a receiver antenna, a theft alarm will be activated. For deactivation, the strip may be additionally covered by relatively spaced lengths of metal made of a magnetically hard material which can be magnetized prior to passage through the detection system.

Further, a security element is suggested incorporating a magnetically soft thin-layer film applied to a foil substrate by vapor deposition or sputtering. For deactivation, a magnetically hard metal foil made of nickel, for example, may be provided above and/or below the film.

Additionally, as an alternative to the magnetic surveillance systems, electromagnetically operating oscillating circuits are recommended which can be implemented as thin-film circuits. At the exit, an electromagnetic high-frequency field is applied to the oscillating circuits comprised of a capacitor and an inductor, causing the circuits to likewise emit waves at resonance which are detected by means of suitable antennae to set off an alarm.

One method by which the above discussed embodiments of the anti-theft labels or tags can be manufactured can be accomplished if the security elements are provided on a backing strip, wherein the security elements are attached by means of adhesive to the backing strip. The security elements can then be separated from the backing strip on a dispensing edge and can be laminated together with the cover layer.

The basic idea is thus to essentially detach the security elements from a backing strip and to then dispense the security elements so that the security elements arrive at the desired position on the security label or tag. The security elements, which can be of any desired shape and size, can thus first be fastened by means of an adhesive connection to a backing strip, and during the manufacture of the security labels, the security elements can be successively detached from the backing strip on a dispensing edge. The security element thereby detached can then be combined with the other parts of the label or tag and these parts can be connected by lamination. It can thereby be essential that the position of the security element on the label or tag (which label or tag will essentially be moving past the security element during attachment) is defined by the time of the dispensing process, and can thus be controlled as desired. In this manner, it essentially becomes possible in particular to provide large labels or tags with significantly smaller security elements instead of providing a security element along the entire width of a label or tag.

The advantages of the above-discussed method reside primarily in the fact that the production costs of the security labels or tags can be reduced by reducing the surface area of the security elements. With the above-discussed method, it essentially can become possible to attach standardized security elements to labels and tags of any type and size. This can then essentially result in a decisive reduction of storage costs, since it can then become sufficient to maintain an inventory of only one type of security element.

For the secure connection of the security elements to the safety labels, or to the merchandise to which the labels are attached, or to the tags, the present invention teaches that the security elements can be attached by means of an adhesive connection to the backing strip, wherein the side of the label facing the backing strip retains the adhesive even after the dispensing process, i.e. after the security element has been detached from the backing strip. The adhesive layer used to connect the security element to the backing strip can thus also be used to attach the security element to the label or tag components after the dispensing process.

In the context of the concrete configuration of the present invention, there are various possibilities relating to the lamination. In one advantageous embodiment, a surface of the cover layer can be provided with a self-stick coating or adhesive, and the security elements can be applied to this adhesive surface of the cover layer. The security elements can then be fixed in place by means of the layer of adhesive already present on the cover layer. In this case, to provide the largest possible adhesive surface for attaching such a security label to an item of merchandise, the adhesive coating of the security elements, which adhesive layer is essentially used to attach the security elements to the backing strip, can be positioned so that the adhesive of the security element is opposite the self-adhesive coating of the cover layer. Thus, upon removing the backing strip from the label, the entire exposed surface of the label would then still be covered with adhesive.

In particular when a cover layer is used, the self-adhesive surface of the cover layer can be fastened to any desired backing strip. This backing strip is designated the first cover layer/backing strip herebelow. During manufacture the first cover layer/backing strip is removed from the cover layer, so that the self-adhesive surface of the cover layer is exposed. The security elements are then dispensed onto the cover layer. Then the cover layer, which is now provided with security elements, is applied to a second cover layer/backing strip.

As an alternative to the dispensing of the security elements onto the cover layer, the security elements can be connected by means of adhesive to a backing strip, onto which the cover layer is then applied. The fastening of the security elements to the backing strip, which is designated the second cover layer/backing strip below, is preferably done by means of the same adhesive coating with which the security element was fastened to the backing strip before the dispensing process. As a rule, the surface of the cover layer which is in contact with the second cover layer/backing strip would typically also be provided with a self-adhesive coating.

It can thus be appropriate to use a cover layer which is fastened to a first cover layer/backing strip by means of a self-adhesive layer. The first cover layer/backing strip can then be removed from the cover layer before the cover layer is connected by adhesive to the second cover layer/backing strip with the security elements.

It is also possible to combine a cover layer, which has been previously punched, with the security elements. The alternative, of only punching out the cover layer after it has been laminated with the security elements in their final form as labels or tags, is also conceivable.

The materials which can be used for the cover layer are primarily paper, cardboard and plastic. If the cover layer is a printable label paper, and the second cover layer/backing strip is a paper coated with silicone, security labels can be manufactured which can be used in conventional hand-held labelling units. Heavy-duty security tags in particular can be made of cardboard or plastic, e.g. such as those used to label textiles.

The embodiments of the present invention as set forth above will be discussed in more detail herebelow with reference to the accompanying drawings. It should be understood that when the word "invention" is used in this application, the word "invention" includes "inventions", that is, the plural of "invention". By stating "invention", Applicants do not in any way admit that the present application does not include more than one patentably and non-obviously distinct invention, and maintains the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

In summary, one aspect of the invention resides broadly in a strip of pre-manufactured labels or tags comprising: a first material, the first material comprising a strip having a longitudinal dimension and a width dimension, the longitudinal dimension being substantially greater than the width dimension; a second material attachable to the strip of first material, the second material comprising one oft a strip of the second material; and a plurality of individual units of the second material; at least one of the first strip of material and the second material comprising a surface for displaying information thereon; third material apparatus for being selectively disposed between the first and second material, the third material apparatus comprising a third material, and the third material comprising one of: a strip of the third material; and a plurality of individual units of the third material; and apparatus for being attached to an article; the strip of labels or tags being divided into a multitude of separable label or tag units, the multitude of separable units comprising: a multitude of first units, the first units comprising each of the first material, the second material and the third material; and a multitude of second units interspersed among the multitude of first units, the second units comprising the first material and the second material, and the second units not including the third material.

Another aspect of the invention resides broadly in a strip of labels or tags comprising: a first material, the first material comprising a strip having a longitudinal dimension and a width dimension, the longitudinal dimension being substantially greater than the width dimension; a second material attachable to the strip of first material, the second material comprising one of: a strip of the second material; and a plurality of individual units of the second material; at least one of the first strip of material and the second material comprising a surface for displaying information thereon; a third material for being disposed between the first and second material of at least some of the units, the third material comprising a plurality of individual units of the third material; the strip of labels or tags being divided into a multitude of separable label or tag units, each of the multitude of separable label or tag units defining a periphery, a width dimension and a length dimension substantially transverse to the width dimension; the individual units of the third material for being selectively disposed between the first and second material of at least some of the label or tag units at a location within the periphery of the first and second units; and the location of the individual units of the third material being different for different ones of the label or tag units, the location being variable in at least one of: along the width dimension of the label or tag units; and along the length dimension of the label or tag units.

BRIEF DESCRIPTION OF THE DRAWINGS

Embodiments of the present invention will now be described in more detail herebelow with reference to the accompanying drawings, in which:

FIG. 8 shows a schematic illustration of an alternative method in which the security elements are dispensed from a backing strip; and FIGS. 9a–9c show various embodiments of security elements.

DESCRIPTION OF THE PREFERRED EMBODIMENTS

Figure 1:
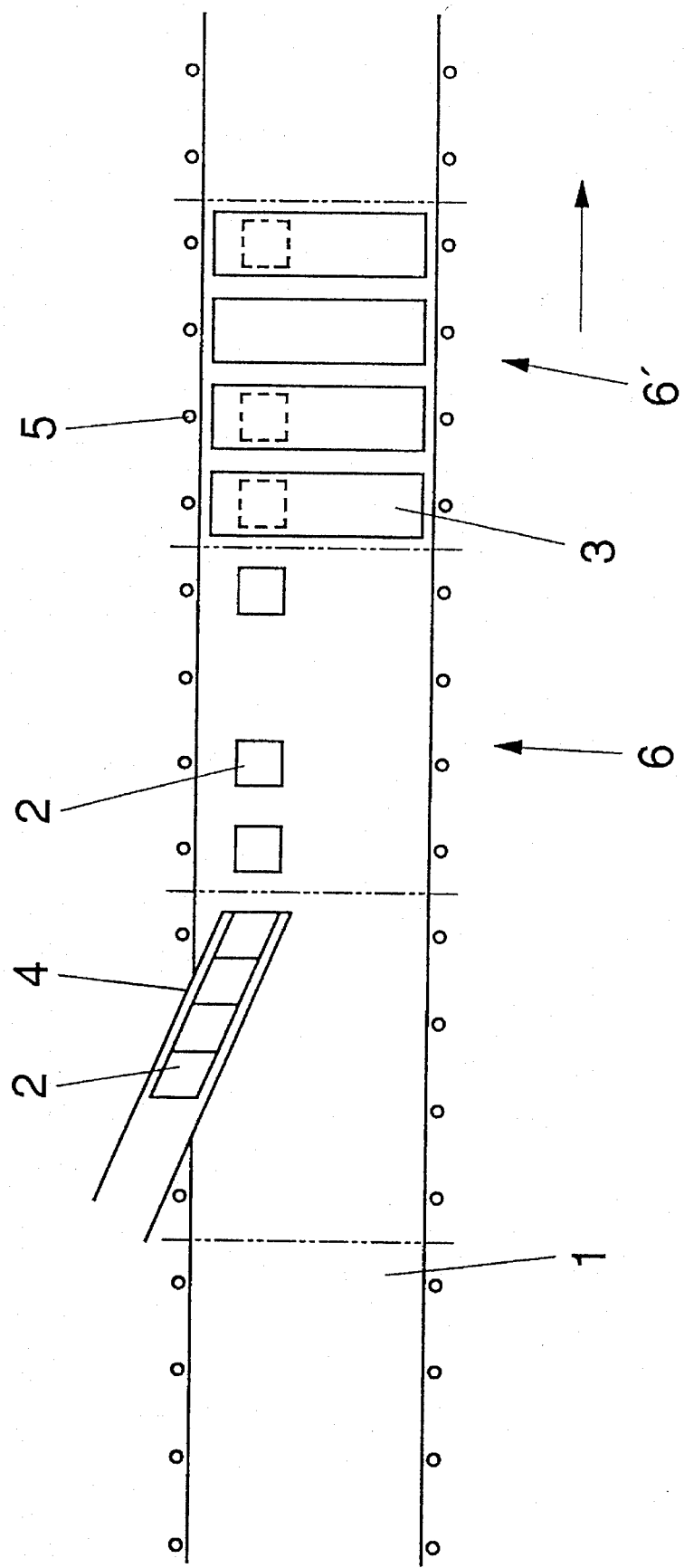
FIG. 1 shows the manufacture of webs of substrate including security elements arranged in a regular pattern.

Referring now to FIG. 1 of the drawings, a substrate 1 carried on rotary rollers 5 travels from left to right. The substrate 1 can preferably be a paper coated with silicon for the production of adhesive labels 3 as shown, or alternatively, for tags, the substrate 1 could be cardboard, or even plastic. A dispensing head 4 can be provided to dispense security elements 2 of a known kind onto the substrate 1. A further discussion relating to the dispensing of the security elements is included further herebelow with reference to FIGS. 1a and 6–8, and the security elements themselves are further discussed herebelow with reference to FIGS. 9a, 9b and 9c.

In FIG. 1, as can be seen from the sections 6, 6' (each section 6, 6' corresponding to four labels 3 each), the pattern of the security elements 2 is repeated after the substrate 1 has traveled the length of four labels 3. The repetition of the pattern can essentially be controlled by means of suitable control of a dispensing mechanism 4a (see FIG. 1a) of the dispensing head 4. As such, every second label 3 of a four label set, would essentially not carry a security element 2. In the right-hand section 6' when viewing FIG. 1, the security elements 2 positioned on the substrate 1 are already provided with a label material 3a to form the labels 3, and the security elements 2 thereof are represented only schematically. The label material can preferably be provided from a second dispensing head 15 as shown in FIG. 1a.

Figure 1A:
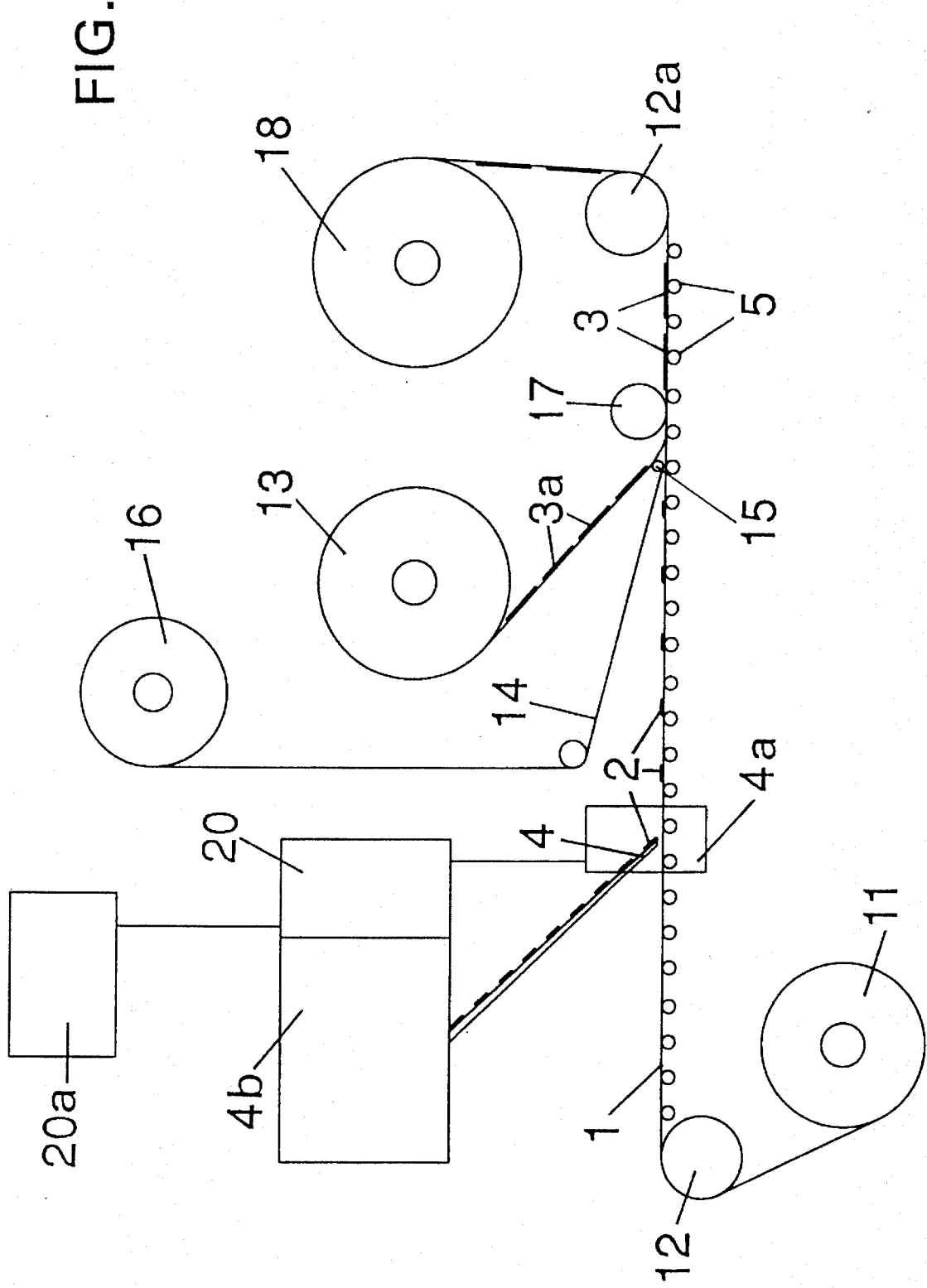
FIG. 1a shows a side view of one possible assembly system in accordance with FIG. 1.

As depicted in FIG. 1a, the substrate 1 can be provided from a roll 11. Such a substrate, in the case of labels, could essentially be a peel-away backing material for the labels 3. It is known to provide such a backing material with a material which minimally adheres to adhesive, such as a silicone coating. Alternately, the substrate 1 could comprise a paper material, etc., which forms a permanent part of the label 3, and while not shown, is adhered to a peel-away backing material at a later step. A guide roller 12 can be provided to guide the substrate 1 to the assembly area disposed along the row of rollers 5. As the substrate 1 is moved past the dispensing head 4, a dispensing device 4a, represented only schematically, supplied with security elements 2 from a supply area 4b, also represented only schematically, can be operated in a controlled manner to dispense a security element 2 onto the backing material. Each security element 2 could be provided with adhesive on its side disposed towards the substrate 1 to adhere the security element 2 in place on the substrate 1.

After receiving a security element, the substrate can travel further along the rollers 5 to the dispensing head 15 where the label material 3a is dispensed onto the substrate 1. The label material 3a can have an adhesive 40 (see FIG. 9a) on its side facing the substrate 1. The label material 3a can be provided by a roll 13 of label material 3a disposed on a peel-away backing 14. The peel-away backing 14 can be guided around a sharp bend, such as a roller, which forms dispensing head 15, wherein the label material 3a will tend to travel further in a straight line and thereby become detached from the backing material 14. The backing material 14 can travel to a take up roller 16.

Upon the label material 3a becoming free from the backing material 14, the label material 3a will essentially come into contact with the substrate 1 and can then cover a security element 2, that is, in the case where a security element 2 is present. An auxiliary roller 17 can be provided to firmly press, and laminate the label assembly together to provide a sufficient adhesive bond for holding the label material 3a, security element 2 if present, and substrate 1 together. The now essentially completed labels 3 can then be further guided around a second guide roller 12a, and can be wound up on a take-up roller 18.

Figure 2:
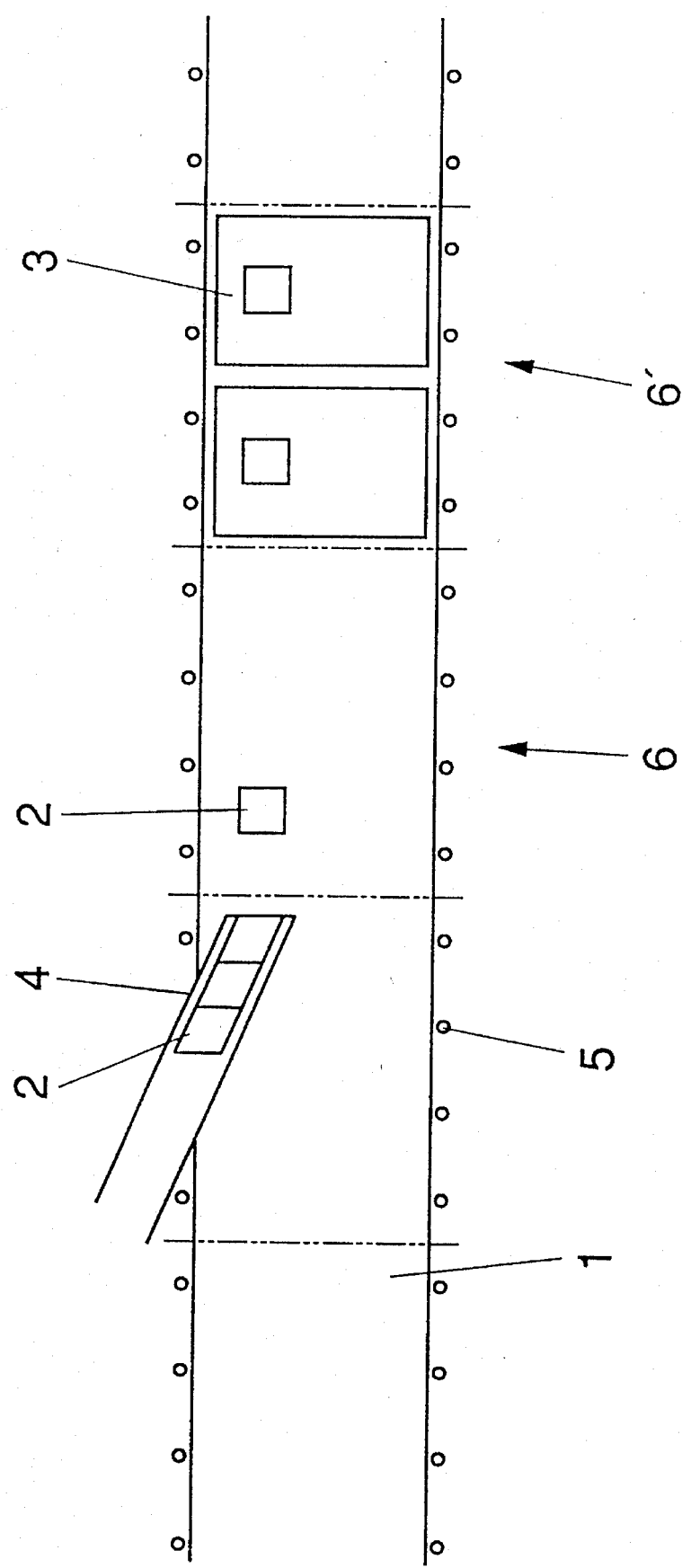
FIG. 2 shows the manufacture of webs of substrate including security elements arranged in a random fashion.

In contrast to FIG. 1, FIG. 2 does not reveal any fixed pattern of the security elements 2. In this respect, for the first section 6, on the left when viewing the drawing, only one label 3 will be protected, while the two labels 3 shown in the right-hand section 6' are both provided with security elements 2. In other words, the dispensing head 4 can be operated in a random manner to dispense out a security element 2 for a predetermined percentage of the labels 3. As such it might be preferable to have about 80% of the labels 3 have a security element 2. Alternatively, it might be preferable, for someone wishing to reduce costs even further, to use an even smaller percentage of security elements 2, which percentage might even extend as low as 50%.

The deposition of the security elements 2 by the dispensing head 4 can essentially be controlled by a dispensing device 4a, shown only schematically in FIG. 1a for simplification purposes only. The dispensing device 4a could preferably be computer controlled and operated via a computer processor 20. It is desirable that the computer processor 20 be provided with an input device 20a for at least entering the percentage of labels which will receive security elements 2, or possibly the percentage of labels 3 which will not receive security elements 2. Alternatively, as will be discussed in more detail below with reference to FIGS. 6–8, the security elements 2 could be dispensed in a manner similar to the dispensing of the label material 3a at the dispensing head 15. That is, the security elements could possibly be provided on a backing material which is wound between a supply and a take-up roll, wherein the take-up roll could be operated by the computer processor 20 to dispense a security element 2 at the appropriate time, and in cases where no security element 2 is to be dispensed, the take-up roll could be kept idle.

Figure 3:
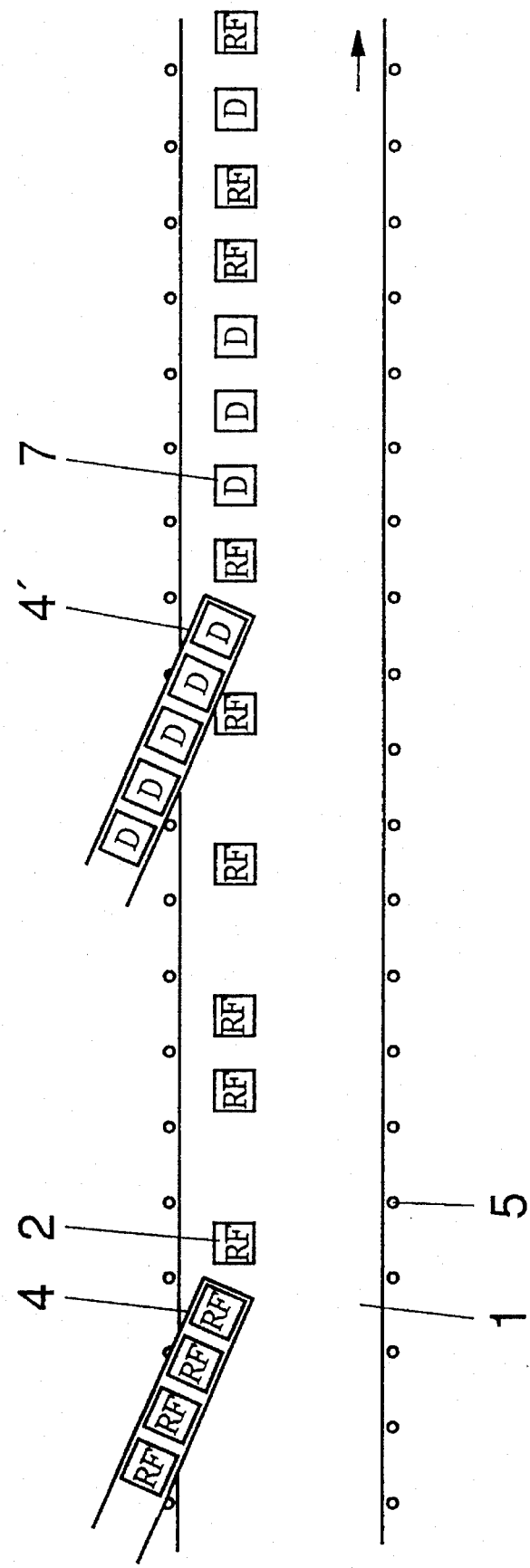
FIG. 3 shows the manufacture of webs of substrate including dummies of security elements.

In an alternative embodiment, instead of simply leaving off a security element 2, FIG. 3 shows the manufacture of a web of substrate whose labels will be provided partly with security elements 2 (marked RF) and partly with dummies 7 (marked D). The label material 3a discussed earlier with regard to FIG. 1 has been omitted from FIG. 3 for simplicity. Thus, in places where the previous embodiments might have simply not been provided with a security element 2, the present embodiment provides a dummy element 7. While the security elements 2 are dispensed onto the substrate 1 by means of the left-hand dispensing head 4 when viewing the drawing, a second dispensing head 4' can serve the function of applying the dummies 7. To make the labels 3 having dummies 7 appear to be security labels, it is preferable that the dummies 7 be conformed to the security elements in form, size and color.

In other words, if the security element 2 is a metal strip, the dummies 7 could simply be a thin strip of paper colored essentially the same as the metal strip, and having essentially the same dimensions. Alternatively, a cheaper metal could be provided such as a strip of aluminum foil, etc., wherein the foil would not be capable of being detected, but would merely serve to confuse the potential thief into thinking that the article was in actuality a protected article. In another possible embodiment, the label material could possibly simply be provided, on its reverse side, with a printed image representing a metal strip, so that from the front of the label 3, it might appear that there is a metal strip present. If a circuit configuration is used for an electromagnetic detection device, printed ink dummies could be provided which have an ink image which resembles the actual circuit of the electromagnetic detection device.

In a further embodiment, if only a single dispensing head 4 was available, the dummies 7 could be intermixed, preferably randomly, with the security element 2 that are being fed to the dispensing head 4. In other words, if the security elements 2 and dummies 7 were being supplied from a single backing strip, the backing strip could be manufactured with the security elements 2 and dummies 7 already in a random pattern.

Figure 4:
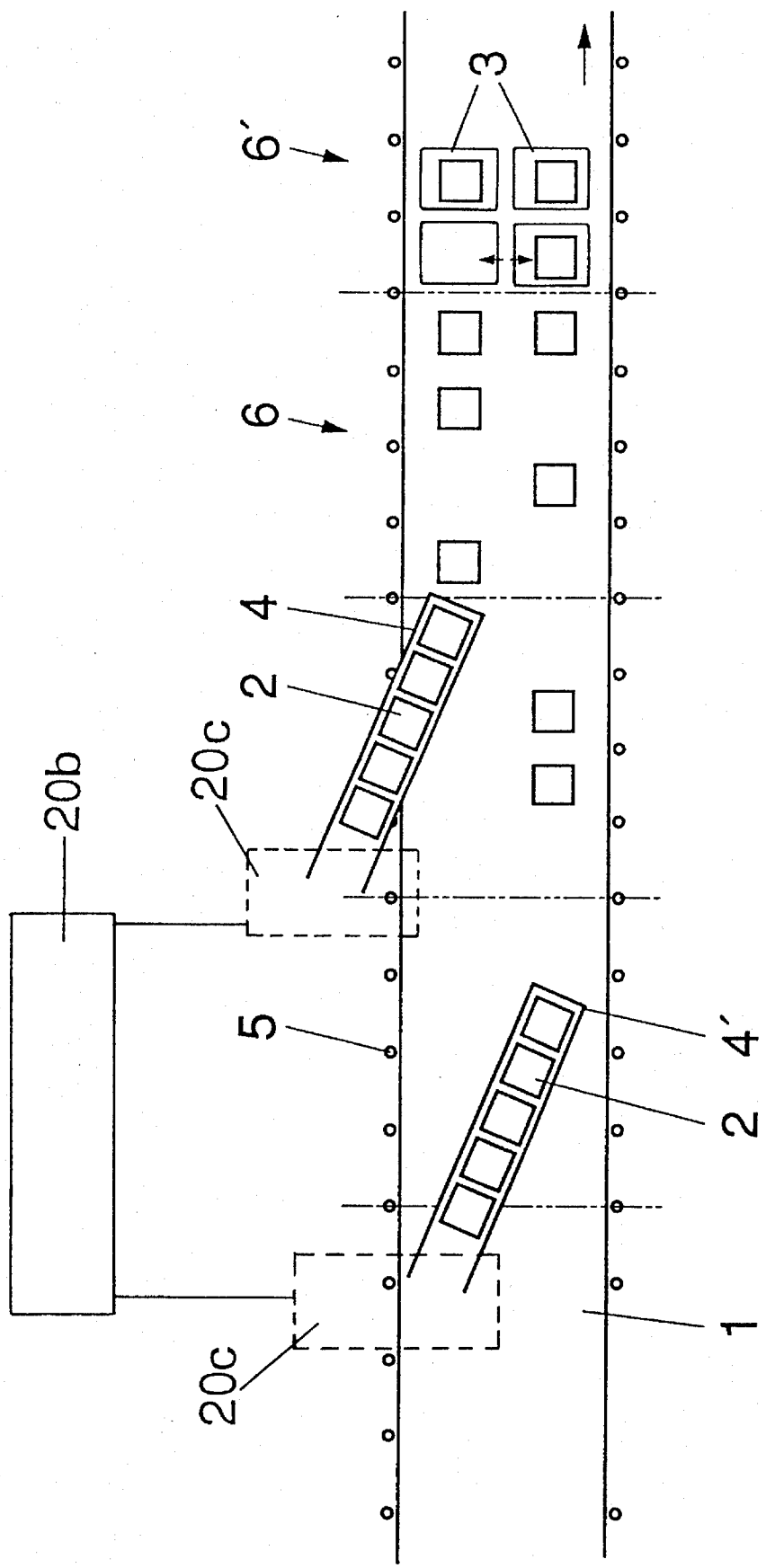
FIG. 4 shows the manufacture of webs of substrate including security elements positioned at different locations with several dispensing heads.

FIG. 4 depicts a still further alternative embodiment wherein, in addition to randomly leaving some of the labels without a security element 2, the security elements 2 are placed in variable positions in the labels 3. In FIG. 4, security elements 2 are dispensed onto the substrate 1 from two different dispensing heads 4, 4' offset across the width (that is, in the plane of the labels 3, orthogonal to the travel direction) and along the feed direction of the substrate 1. It will be seen from the sections 6, 6' that some positions remain vacant, with the result that not all labels 3 are provided with security elements 2. In addition, the pattern of the security elements 2 varies in a random fashion. The device shown in FIG. 4 may be used for dispensing security elements 2 onto the substrate 1 for labels 3 placed side-by-side across the width of the substrate 1 (as shown), or for dispensing security elements 2 at varying positions onto single labels 3 extending across the entire width of the substrate 1 (as shown previously in FIG. 1). In either case, some of the individual labels 3 may remain free of security elements 2.

It can also be possible, with the apparatus depicted in FIG. 4 to pivot the dispensing heads 4, 4' sideways to vary the position of the security elements 2 in the lateral direction across the width of the substrate 1. Finally, by varying the dispensing moment for the security elements 2, the position of the security elements 2 may also be varied in the direction of travel of the substrate 1. An appropriate control device, such as a computer processor unit 20b can also be provided for controlling movement devices 20c, which could be stepping motors, etc. to randomly pivot the dispensing heads 4, 4a, or randomly controlling the dispensing moment of the instant the labels are dispensed to thereby randomly position the security elements 2 at various positions in the labels. In a similar manner, although not repeated here, dummies 7 could also be randomly positioned on the substrate 1 instead of leaving the empty spaces as shown.

By varying the position of the security elements 2, a potential thief might be fooled into thinking one label does not have a security element 2 if the security element 2 is not disposed in the same place as a security element 2 in another label 3. The thief may then attempt to steal an unknowingly protected element.

Figure 5:
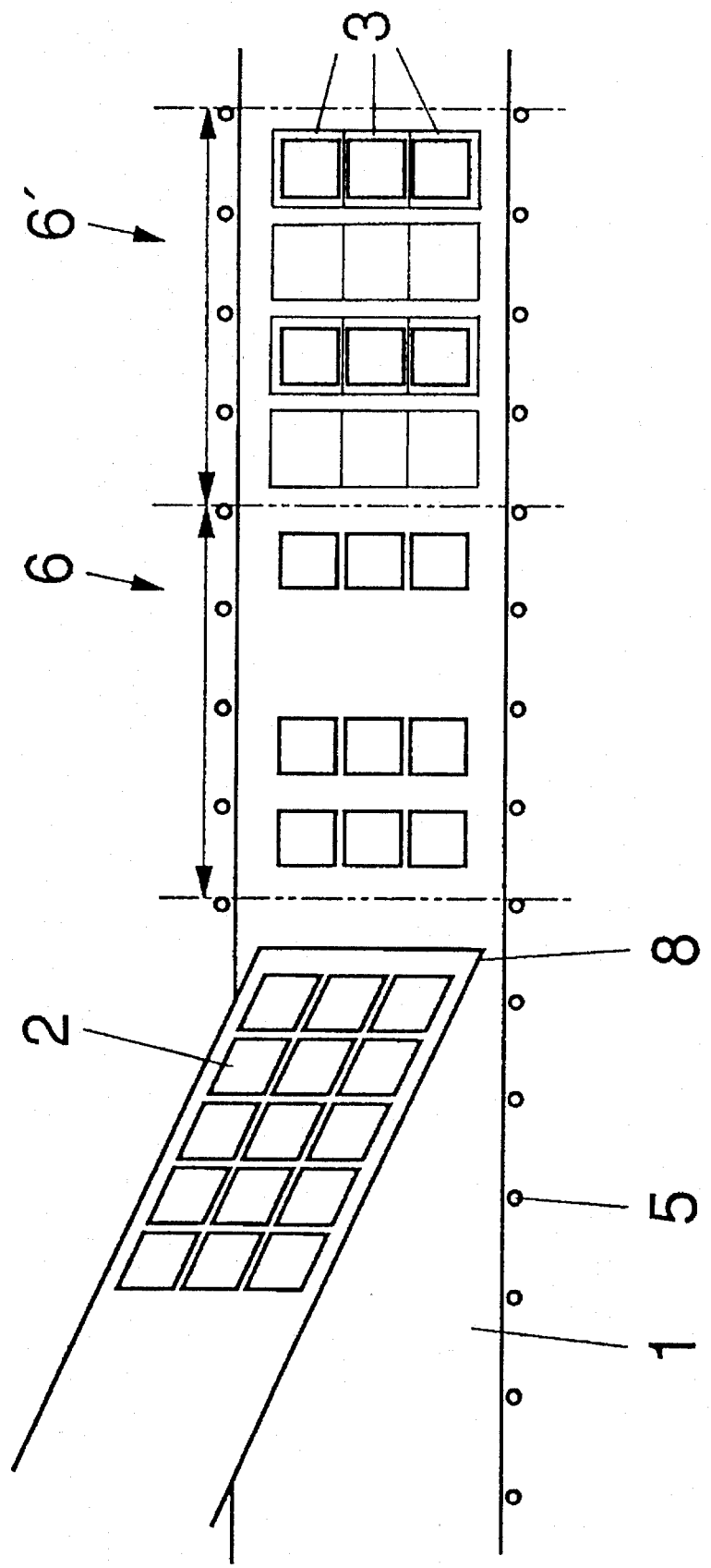
FIG. 5 shows the manufacture of webs of substrate including security elements positioned at different locations with one dispensing head.
Figure 5A:
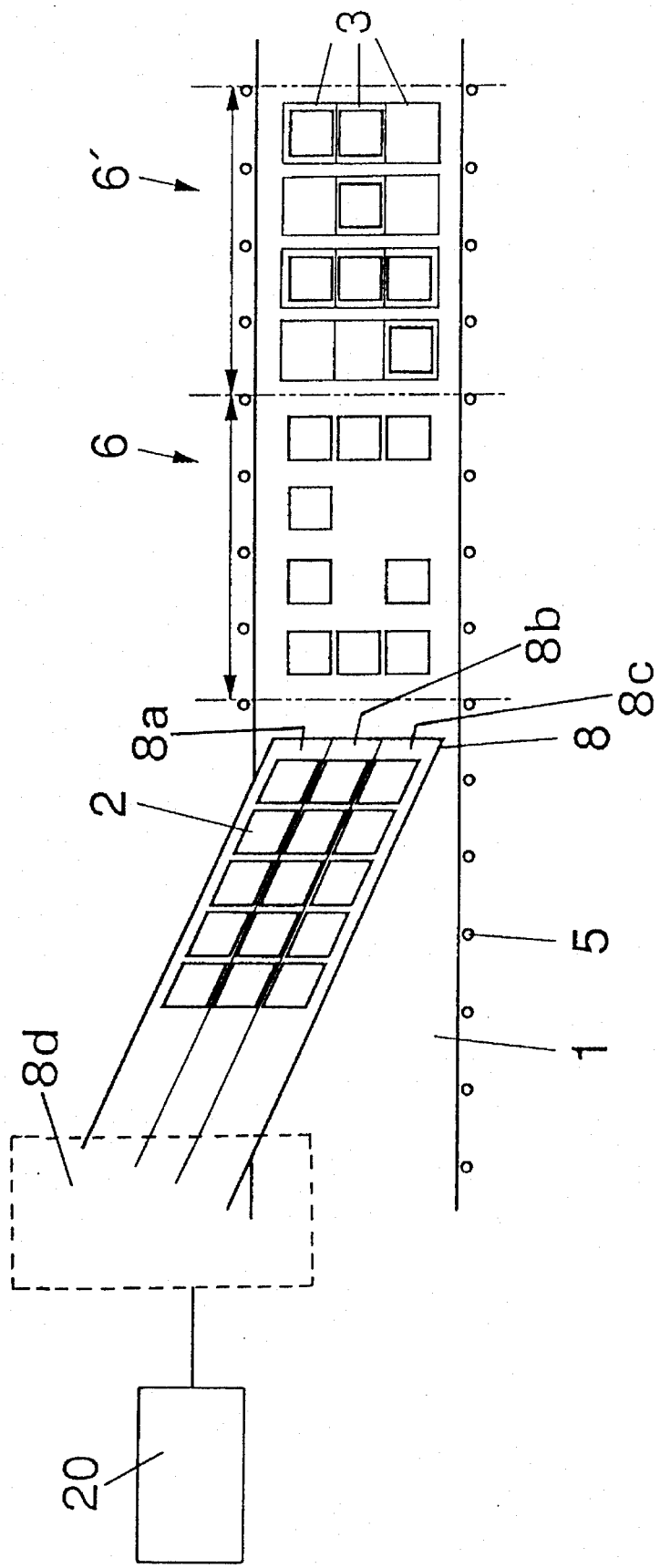
FIG. 5a shows a variation on the embodiment of FIG. 5 wherein the dispensing head has three dispensing channels arranged side-by-side.

In contrast to FIG. 4, the substrate 1 of FIG. 5 is provided with security elements 2 by means of a single dispensing head 8. However, the dispensing head 8 incorporates three dispensing channels in a side-by-side arrangement. Such an apparatus can therefore be suitable for dispensing security elements 2 onto a total of three labels 3 disposed side-by-side across the width of the substrate 1. In the depicted embodiment of FIG. 5, the dispensing head 8 dispenses rows of security elements 2, side-by-side, essentially randomly, thereby leaving random rows of labels without a security element 2, i.e. the second and fourth rows (from the right) in section 6', and only the second row of section 6. As shown in FIG. 5a, it could also be possible that each of three dispensing channels 8a, 8b, 8c of the dispensing head 8 could be activatable independently of each other by an activation device 8d controlled by the computer processor 20. Thus, for rows of three labels, an essentially completely random sequence of security elements can be provided by each of the three dispensing channels across each of the label rows. Alternatively, for labels 3 which utilize the entire width of the substrate 1 (such as depicted in FIG. 1), a label 3 could be provided with a security element 2 at any of the three different locations by operating an appropriate one of the channels 8a, 8b or 8c.

It should be understood that each of the above discussed embodiments of FIGS. 1–5 could be used essentially independently of the others, or combinations of the embodiments could be used. For example, the empty space on the substrate 1 in FIGS. 4 and 5 could be filled with dummies 7 as shown in FIG. 3, while the dispensing heads 4 and 4' of FIG. 3 could be pivotable or time delayed to vary the position of the security elements 2 and dummies 7 applied in accordance with the discussion of FIG. 3.

The result of the above embodiments is essentially a web, or strip of security labels affording good value and a high safeguard against theft.

Figure 6:
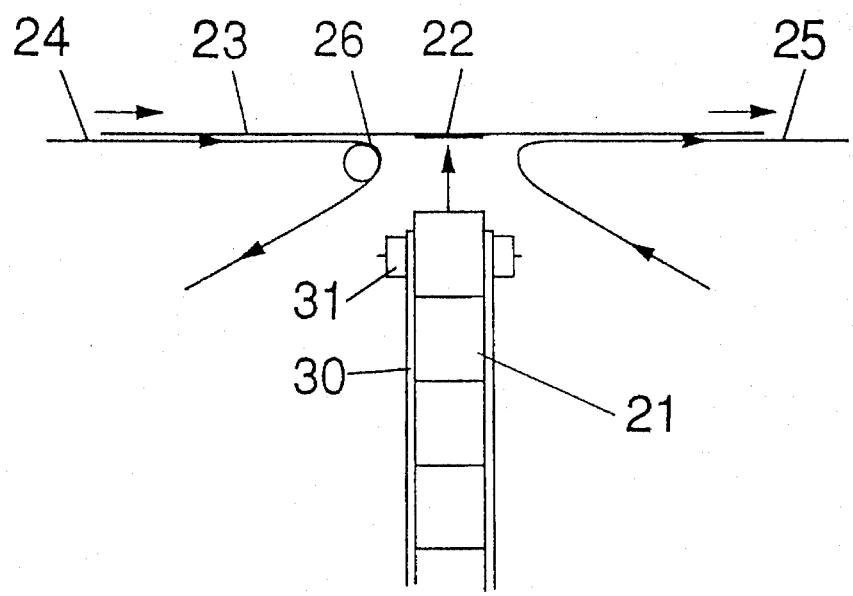
FIG. 6 shows a schematic illustration of a method using punched labels.

One possible manner in which the security elements 2 as mentioned above, can be assembled onto the material of the above-discussed anti-theft labels or tags is shown in FIG. 6. In FIG. 6, a dispensing head 21 is used to detach security elements 22 (essentially corresponding to security elements 2 as discussed above) from a backing strip 30. The security elements 22 are preferably adhesively connected to the backing strip 30. By pulling the backing strip 30 about a dispensing edge, or roller 31 (as was discussed above with respect to FIG. 1a and label material 3a), the security elements 22 can essentially be detached from the backing strip 30. The dispensing head 21 essentially dispenses the security elements 22 onto a cover layer 23, which cover layer 23 can already have been punched out into its final form.

The cover layer 23 can essentially be initially connected by means of adhesive to a first cover layer/backing strip 24, and the cover layer 23 can be separated from the first cover layer/backing strip 24 at a dispensing edge 26 which could also be a roller. As a rule, the speed at which the cover layer 23 is transported past the dispensing head 21 can essentially remain constant. Then the security elements 22 can be successively attached to the exposed cover layer by means of the dispensing head 21. The backing strip 30 with the security elements 22 would essentially not necessarily need to be moved continuously, but in steps, or in cases where no security elements 22 were to be attached, movement of the backing strip 30 could be completely stopped for a duration of time corresponding to the width of a label passing by the dispensing head 21. During each advancing step of the dispensing head 21, a security element 22 can be separated in a known manner by means of a dispensing edge (i.e. formed by the roller 31) from its backing strip 30, whereby the separated security element 22 can then enter into an adhesive connection with the exposed cover layer 23. The security label, which can essentially now be complete, can then be attached to a second cover layer/backing strip 25. It is apparent that the position of the security element 22 on the finished security label is determined by the time at which the security element 22 is separated from its backing strip, and can thus be controlled as necessary.

Figure 7:
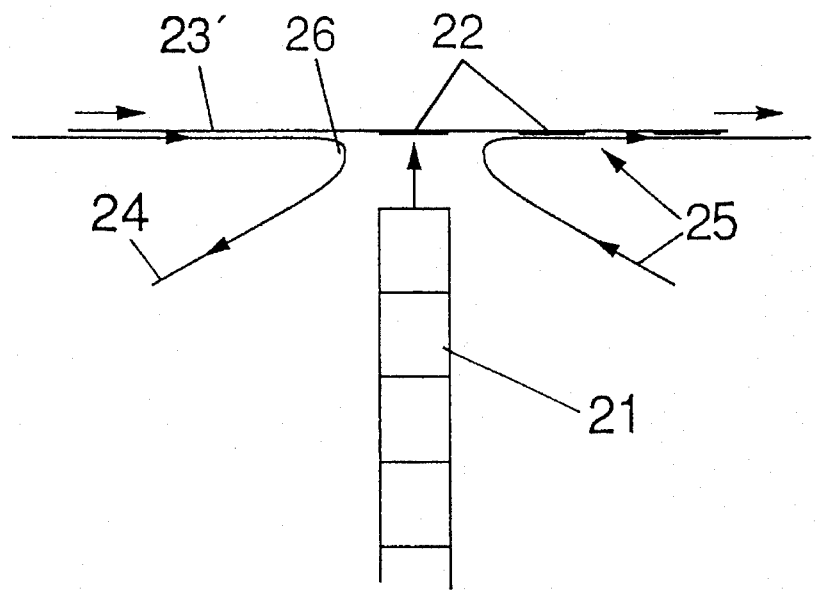
FIG. 7 shows a schematic illustration of a method using labels which are not punched.

FIG. 7 shows a cover layer 23' which can essentially be of approximately the same length as the cover layer 23 shown in FIG. 6, but in this embodiment, the cover layer 23' can be, for example, a laminate, which must still be punched into labels of the final desired form. As shown, the cover layer 23' can preferably essentially provide five individually punched labels.

In FIG. 8, the cover layer 23, which can be both a punched laminate (as in FIG. 6) and also a non-punched laminate (as in FIG. 7), can be moved at an approximately constant speed, and at the dispensing edge 26 the cover layer 23 can be separated from the first cover layer/backing strip 24 and deposited on a second cover layer/backing strip 25. The security elements 22 however, in contrast to those in preceding FIGS. 6 and 7, can be deposited by means of the dispensing head 21 onto the second cover layer/backing strip 25, which can be moved at the same speed as the cover layer 23. Only then is the cover layer 23 laminated to the second cover layer/backing strip 25, which second cover layer/backing strip 25 has already been supplied with security elements 22. It should also be noted that the backing strips 24, 25, with or without the cover layer 23, can be unwound from rolls and are wound up on other rolls in a similar manner as depicted above with regard to FIG. 1a.

It is apparent that the above discussed embodiments of the present invention make it possible to attach the security elements to any desired point of the labels or tags. It would also be conceivable, as discussed above, for example, not to provide every label with a security element, but to attach a security element only to every second, or third, or fourth label, to reduce costs. An additional advantage is that the method set forth by at least one embodiment of the present invention can be used with any type of label and tag.

As shown in FIG. 9a, a first embodiment of a security element can be configured as a narrow strip of a magnetically soft material 35. At the surveillance gate, an alternating magnetic field can then be applied, causing reversal of the magnetization in accordance with the respective frequency of the alternating field. Because the strip 35 then emits an alternating field itself which is detected by a receiver antenna, a theft alarm will be activated. For deactivation, the strip may be additionally covered by relatively spaced lengths of metal 36 made of a magnetically hard material which can be magnetized prior to passage through the detection system. The magnetized hard metal 36 then inhibits the changing of the magnetic field of the soft strip 35, thereby not setting off the detector device.

Further, as shown in FIG. 9b, a security element is suggested incorporating a magnetically soft thin-layer film 37 applied to a foil substrate 38 by vapor deposition or sputtering. For deactivation, a magnetically hard metal foil 36 made of nickel, for example, may be provided above and/or below the film.

Additionally, as an alternative to the magnetic surveillance systems, electromagnetically operating oscillating circuits 39 are recommended which can be implemented as thin-film circuits. At the exit, an electromagnetic high-frequency field is applied to the oscillating circuits comprised of a capacitor and an inductor, causing the circuits to likewise emit waves at resonance which are detected by means of suitable antennae to set off an alarm.

One feature of the invention resides broadly in the web with security labels comprising a substrate 1 having adhesive labels 3 detachably bonded thereto, or interconnected tags made of a paper-like material, characterized in that only a specified number of the labels 3 or tags is provided with electromagnetically active or activatable security elements 2.

Another feature of the invention resides broadly in the web characterized in that the security elements 2 are irregularly dispersed on the labels 3 or tags.

Yet another feature of the invention resides broadly in the web characterized in that the labels 3 or tags not equipped with security elements 2 are provided with electromagnetically ineffective dummies 7 conformed in shape and color to a security element 2.

Still another feature of the invention resides broadly in the web characterized in that the labels 3 are made of paper, with the dummies 7 being printed on the side of the labels 3 close to the substrate 1.

A further feature of the invention resides broadly in the web characterized in that the dummies 7 are foils or sheets of metal that are adhesively bonded to the side of the labels 3 close to the substrate 1 or are inserted within the tags.

Another feature of the invention resides broadly in the web with security labels comprising a substrate 1 having adhesive labels 3 detachably bonded thereto, or interconnected tags made of a paper-like material provided with electromagnetically active or activatable security elements 2, characterized in that the position of the security elements 2 on the labels 3 or tags varies in a direction along and/or across the web direction.

Yet another feature of the invention resides broadly in the web characterized in that the position of the security elements 2 on the labels 3 or tags varies in an irregular pattern.

Still another feature of the invention resides broadly in the web characterized in that the side of the security elements 2 close to the substrate 1 is adhesive.

A further feature of the invention resides broadly in the web characterized in that the security elements 2 are positioned inside the labels 3 or tags.

Another feature of the invention resides broadly in the web characterized in that the security elements 2 are strips of a magnetically soft material.

Yet another feature of the invention resides broadly in the web characterized in that the metal strips are covered by relatively spaced lengths of metal strip made of a magnetically hard material.

Still another feature of the invention resides broadly in the web characterized in that the security elements 2 are magnetically soft thin-layer films applied to a foil substrate.

A further feature of the invention resides broadly in the web characterized in that magnetically hard metal foils are provided above and/or below the thin-layer films.

Another feature of the invention resides broadly in the web characterized in that the security elements 2 are oscillating circuits.

Another additional feature of the present invention resides broadly in the method for manufacturing security labels or security tags, in which a cover layer 23 and electromagnetically active or activatable security elements 22 are connected together, characterized by the fact that the security elements 22 are attached by means of an adhesive to a backing strip, and that the security elements 22 are separated from the backing strip on a dispensing edge and are laminated with the cover layer 23.

Another feature of the invention resides broadly in the method characterized by the fact that the security elements 22 are connected by means of adhesive to the backing strip so that they remain adhesive after they are separated from the backing strip.

Yet another feature of the invention resides broadly in the method characterized by the fact that the security elements 22 are attached to a surface of the cover layer 23 which is provided with a self-adhesive coating.

Still another feature of the invention resides broadly in the method characterized by the fact that the cover layer 23 is connected by means of the self-adhesive surface to a first cover layer/backing strip 24, that the first cover layer/backing strip 24 is separated from the cover layer 23, that the security elements 22 are applied to the self-adhesive surface of the cover layer 23, and that the cover layer 23 with the security elements 22 is applied to a second cover layer/backing strip 25.

A further feature of the invention resides broadly in the method characterized by the fact that the security elements 22 are attached by means of an adhesive to a second cover layer/backing strip 25, and that one surface of the cover layer 23 is attached to the second cover layer/backing strip 25 with the security elements 22.

Another feature of the invention resides broadly in the method characterized by the fact that a cover layer 23 with a self-adhesive surface is fastened to a first cover layer/backing strip 24, and that the first cover layer/backing strip 24 is detached from the cover layer 23 before the cover layer 23 is connected by means of adhesive to the second cover layer/backing strip 25 with the security elements 22.

Yet another feature of the invention resides broadly in the method characterized by the fact that the cover layer 23 is punched out before it is laminated with the security elements 22.

Still another feature of the invention resides broadly in the method characterized by the fact that the cover layer 23 is punched out after it is laminated with the security elements 22.

A further feature of the invention resides broadly in the method characterized by the fact that the cover layer 23 is made of paper, cardboard or plastic.

Another feature of the invention resides broadly in the method characterized by the fact that the security elements 22 are resonant circuits and/or magnetically soft metal strips and/or magnetically soft thin film coatings.

Some examples of methods of assembly of labels and the apparatus associated therewith which could possibly be used in the context of the assembly in accordance with the present invention might be, or are disclosed by the following U.S. Patents: U.S. Pat. No. 5,195,265 to Klingenberg, entitled "Labelling Method and System Having Adhesive Over a Majority of Rear Surface"; U.S. Pat. No. 5,284,688 to Hiatt, entitled "Pressure Sensitive Adhesive Labels and Manufacture Thereof"; U.S. Pat. Nos. 5,262,214 and 5,222,766 to Instance, both entitled "Labels and Manufacture Thereof"; U.S. Pat. No. 5,236,535 to Smith, entitled "Method for the Manufacture and Placement of Pressure-Sensitive Composite Components and Associated Apparatus"; U.S. Pat. No. 5,201,988 to Matsumoto and Suzuki, entitled "Method of Manufacturing A Resonant Tag"; and U.S. Pat. No. 5,201,976 to Eastin, entitled "Method of Producing a Continuous Label Web".

Some examples of security elements and their respective methods of assembly which could possibly be used in the context of the labels of the present invention might be, or are disclosed by the following U.S. Patents: U.S. Pat. No. 4,818,312 to Benge, entitled "Method of Making Electronic Tags"; U.S. Pat. No. 4,910,499 to Benge, et al., entitled "Tag and Method of Making Same"; U.S. Pat. No. 5,006,856 to Benge et al., entitled "Electronic Article Surveillance Tag and Method of Deactivating"; U.S. Pat. No. 5,108,822 to Imaichi et al., entitled "Resonant Tag and Method of Manufacturing the Same"; U.S. Pat. No. 4,021,705 to Lichtblau, entitled "Resonant Tag Circuits Having One or More Fusible Links"; U.S. Pat. No. 4,900,386 to Richter-Jörgensen, entitled "Method of Producing Labels Each Having a Circuit Forming an Oscillating Circuit"; U.S. Pat. No. 5,059,950 to Perchak, entitled "Deactivatable Electronic Article Surveillance Tags, Tag Webs and Method of Making Tag Webs; and U.S. Pat. No. 5,181,021 to Lee et al., entitled "Responder Target for Theft Detection Apparatus".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 44 16 444.0, filed on May 10, 1994 and P 44 36 284.6, filed on Oct. 11, 1994, having inventors john Chamberlain and Gordon Klassen, and DE-OS P 44 16 444.0 and P 44 36 284.6 and DE-PS P 44 16 444.0 and P 44 36 284.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A strip of premanufactured labels or tags comprising:
   a first material, said first material comprising a strip having a longitudinal dimension and a width dimension, the longitudinal dimension being substantially greater than the width dimension;
   a second material attachable to said strip of first material, said second material comprising one of:
   a strip of said second material; and
   a plurality of individual units of said second material;
   at least one of said first strip of material and said second material comprising a surface for displaying information thereon;
   third material means for being selectively disposed between said first and second material, said third material means comprising a third material, and said third material comprising one of:
   a strip of said third material; and
   a plurality of individual units of said third material; and
   means for being attached to an article;
   said strip of labels or tags being divided into a multitude of separable label or tag units, said multitude of separable units comprising:
   a multitude of first units, said first units comprising each of said first material, said second material and said third material; and
   a multitude of second units interspersed among said multitude of first units, said second units comprising said first material and said second material, and said second units not including said third material.

2. The strip of labels or tags according to claim 1, wherein said multitude of separable units comprises a predetermined ratio of said multitude of second units to said multitude of first units.

3. The strip of labels or tags according to claim 2, wherein said multitude of second units are randomly dispersed among said multitude of first units.

4. The strip of labels or tags according to claim 3, wherein said third material comprises a detectable security element, detectable by detector means configured for detecting said detectable security element.

5. The strip of labels or tags according to claim 4, wherein said units of said multitude of second units comprise a dummy security elements, said dummy security elements having a shape, size and color pattern, said shape, size and color pattern of said dummy security elements being substantially similar to said shape, size and color pattern of said detectable security elements.

6. The strip of labels or tags according to claim 5, wherein:
   said second material comprises a first side disposed towards said first material;
   said dummy security elements comprise a printed image of a detectable security element, said printed image being printed on said first side of said second material; and
   said printed image corresponding in shape, size and color pattern to said shape, size and color pattern of said detectable security elements.

7. The strip of labels or tags according to claim 6, wherein:

said first units and said second units each define a periphery, a width dimension and a length dimension;

said detectable security elements end said dummy security elements are disposed at a location within the periphery of said first and second units; and said location of said detectable security elements and said dummy security elements being different for different ones of said first and second units, said location being variable in at least one of:
along the width dimension; and
along the length dimension.

8. The strip of labels or tags according to claim 7, wherein:

for tags, said first and second materials each comprise one of: a cardboard sheet, and a plastic sheet;

for labels, said second material comprises a paper having adhesive on said first side thereof, and said first material comprises a peel-away backing, said peel away backing having a first side disposed towards said second material, said first side of said peel-away backing comprising a silicon coating for minimally adhering to adhesive of said first side of said second material;

said detectable security elements comprise at least one of: a strip of soft-magnetic material having an alterable magnetic field and disposed adjacent a strip of hard magnetic material having an unalterable magnetic field, a magnetically soft thin-layer film on a foil substrate disposed adjacent a magnetically hard metal strip, and an electromagnetic oscillating circuit; and said detectable security elements have a first side disposed towards said first material and a second side disposed towards said second material, said first side of said detectable security elements having an adhesive thereon.

9. The strip of labels or tags according to claim 5, wherein:

said dummy security elements comprise an inactive foil or metal sheet;

said first units and said second units each define a periphery, a width dimension and a length dimension;

said detectable security elements and said dummy security elements are disposed at a location within the periphery of said first and second units;

said location of said detectable security elements and said dummy security elements being different for different ones of said first and second units, said location being variable in at least one of:
along the width dimension; and
along the length dimension;

for tags, said first and second materials each comprise one of: a cardboard sheet, and a plastic sheet;

for labels, said second material comprises a paper having adhesive on said first side thereof, and said first material comprises a peel-away backing, said peel away backing having a first side disposed towards said second material, said first side of said peel-away backing comprising a silicon coating for minimally adhering to adhesive of said first side of said second material;

said detectable security elements comprise at least one of: a strip of soft-magnetic material having an alterable magnetic field and disposed adjacent a strip of hard magnetic material having an unalterable magnetic field, a magnetically soft thin-layer film on a foil substrate disposed adjacent a magnetically hard metal strip, and an electromagnetic oscillating circuit; and said detectable security elements have a first side disposed towards said first material and a second side disposed towards said second material, said first side of said detectable security elements having an adhesive thereon.

10. The strip of labels or tags according to claim 9, wherein:

said first units and said second units each define a periphery, a width dimension and a length dimension substantially transverse to the width dimension;

said detectable security elements are disposed at a location within the periphery of said first and second units;

said location of said detectable security elements being different for different ones of said first and second units, said location being variable in at least one of:
along the width dimension; and
along the length dimension.

11. The strip of labels or tags according to claim 10, wherein:

for tags, said first and second materials each comprise one of: a cardboard sheet, and a plastic sheet;

for labels, said second material comprises a paper having adhesive on said first side thereof, and said first material comprises a peel-away backing, said peel away backing having a first side disposed towards said second material, said first side of said peel-away backing comprising a silicon coating for minimally adhering to adhesive of said first side of said second material;

said detectable security elements comprise at least one of: a strip of soft-magnetic material having an alterable magnetic field and disposed adjacent a strip of hard magnetic material having an unalterable magnetic field, a magnetically soft thin-layer film on a foil substrate disposed adjacent a magnetically hard metal strip, and an electromagnetic oscillating circuit;

said detectable security elements have a first side disposed towards said first material and a second side disposed towards said second material, said first side of said detectable security elements having an adhesive thereon; and said detectable security element having a shape, a size and color pattern.

12. A strip of labels or tags comprising:

a first material, said first material comprising a strip having a longitudinal dimension and a width dimension, the longitudinal dimension being substantially greater than the width dimension;

a second material attachable to said strip of first material, said second material comprising one of:
a strip of said second material; and
a plurality of individual units of said second material;

at least one of said first strip of material and said second material comprising a surface for displaying information thereon;

a third material for being disposed between said first and second material of at least some of said units, said third material comprising a plurality of individual units of said third material;

said strip of labels or tags being divided into a multitude of separable label or tag units, each of said multitude of separable label or tag units defining a periphery, a width dimension and a length dimension substantially transverse to said width dimension;

said individual units of said third material for being selectively disposed between said first and second material of at least some of said label or tag units at a location within the periphery of said first and second units; and said location of said individual units of said third material being different for different ones of said label or tag units, said location being variable in at least one of: along the width dimension of said label or tag units; and along the length dimension of said label or tag units.

13. The strip of labels or tags according to claim 12, wherein said location of said individual units of said third material vary randomly among said different ones of said label or tag units.

14. The strip of labels of tags according to claim 13, wherein said multitude of label or tag units comprise:

a multitude of first units, said first units comprising each of said first material, said second material and said third material; and a multitude of second units interspersed among said multitude of first units, said second units comprising said first material and said second material, and said second units not including said third material.

15. The strip of labels or tags according to claim 14, wherein said multitude of separable units comprises a predetermined ratio of said multitude of second units to said multitude of first units.

16. The strip of labels or tags according to claim 15, wherein said multitude of second units are randomly dispersed among said multitude of first units.

17. The strip of labels or tags according to claim 16, wherein said third material comprises a detectable security element, detectable by detector means configured for detecting said detectable security element, said detectable security element having a shape, size and color pattern.

18. The strip of labels or tags according to claim 17, wherein:

said units of said multitude of second units comprise a dummy security element, said dummy security elements having a shape, size and color pattern, said shape, size and color pattern of said dummy security elements being substantially similar to said shape, size and color pattern of said detectable security elements;

said second material comprises a first side disposed towards said first material;

said dummy security elements comprise one of:

a printed image of a detectable security element, said printed image being printed on said first side of said second material; said printed image corresponding in shape, size and color pattern to said shape, size and color pattern of said detectable security elements; and an inactive foil or metal sheet;

for tags, said first and second materials each comprise one of: a cardboard sheet, and a plastic sheet;

for labels, said second material comprises a paper having adhesive on said first side thereof, and said first material comprises a peel-away backing, said peel away backing having a first side disposed towards said second material, said first side of said peel-away backing comprising a silicon coating for minimally adhering to adhesive of said first side of said second material;

said detectable security elements comprise at least one of: a strip of soft-magnetic material having an alterable magnetic field and disposed adjacent a strip of hard magnetic material having an unalterable magnetic field, a magnetically soft thin-layer film on a foil substrate disposed adjacent a magnetically hard metal strip, and an electromagnetic oscillating circuit; and said detectable security elements have a first side disposed towards said first material and a second side disposed towards said second material, said first side of said detectable security elements having an adhesive thereon.

19. The strip of labels or tags according to claim 13, wherein said third material comprises a detectable security element, detectable by detector means configured for detecting said detectable security element.

20. The strip of labels or tags according to claim 19, wherein:

for tags, said first and second materials each comprise one of: a cardboard sheet, and a plastic sheet;

for labels, said second material comprises a paper having adhesive on said first side thereof, and said first material comprises a peel-away backing, said peel away backing having a first side disposed towards said second material, said first side of said peel-away backing comprising a silicon coating for minimally adhering to adhesive of said first side of said second material;

said detectable security elements comprise at least one of: a strip of soft-magnetic material having an alterable magnetic field and disposed adjacent a strip of hard magnetic material having an unalterable magnetic field, a magnetically soft thin-layer film on a foil substrate disposed adjacent a magnetically hard metal strip, and an electromagnetic oscillating circuit; and said detectable security elements have a first side disposed towards said first material and a second side disposed towards said second material, said first side of said detectable security elements having an adhesive thereon.

* * * * *

UNITED STATES PATENT AND TRADEMARK OFFICE
CERTIFICATE OF CORRECTION

PATENT NO. : 5,614,278
DATED : March 25, 1997
INVENTOR(S) : John CHAMBERLAIN and Gordon KLASSEN It is certified that error appears in the above-indentified patent and that said Letters Patent is hereby corrected as shown below:

In column 1, line 32, after 'wherein', delete "thee" and insert --the--.

In column 15, line 2, after 'might', delete "he," and insert --be,--.

In column 15, line 54, after 'inventors', delete "john" and insert --John--.

In column 17, line 3, Claim 7, after 'elements', delete "end" and insert --and--.

Signed and Sealed this

First Day of July, 1997

*Attest:*

BRUCE LEHMAN

*Attesting Officer*    *Commissioner of Patents and Trademarks*